(No Model.) 3 Sheets—Sheet 1.
G. N. HOLLAND.
POTATO DIGGER.

No. 545,229. Patented Aug. 27, 1895.

(No Model.) 3 Sheets—Sheet 3.
G. N. HOLLAND.
POTATO DIGGER.

No. 545,229. Patented Aug. 27, 1895.

Witnesses:
A. D. Harrison
Rollin A. Bell

Inventor:
Geo. N. Holland
by
Wright Brown & Quinby
Attys.

UNITED STATES PATENT OFFICE.

GEORGE N. HOLLAND, OF HAMPDEN, MAINE.

POTATO-DIGGER.

SPECIFICATION forming part of Letters Patent No. 545,229, dated August 27, 1895.

Application filed June 7, 1894. Serial No. 513,773. (No model.)

*To all whom it may concern:*

Be it known that I, GEORGE N. HOLLAND, of Hampden, in the county of Penobscot and State of Maine, have invented certain new and useful Improvements in Potato-Diggers, of which the following is a specification.

This invention relates to that class of potato-diggers employing two half-plows to cut away the sides of the hills, an inclined scoop between the plows arranged to take up the central portions of the hills, an endless carrier which receives the earth and potatoes raised upon the scoop and carries the same to a higher point, and a sifter or shaker which receives the matter raised by the carrier and separates the potatoes from the dirt.

The invention has for its object to provide certain improvements in a machine of this class relating to the regulation of the depth of the plows and scoop during the operation, to the convenient raising of the plows and scoop to avoid obstructions and to permit the turning and transportation of the machine when not in operation, to the means for shaking or agitating the sifter or separator, and to the means for throwing the mechanism that actuates the carrier and separator into and out of gear with the driving-shaft.

To these ends the invention consists in the improvements which I will now proceed to describe and claim.

Figure 1:
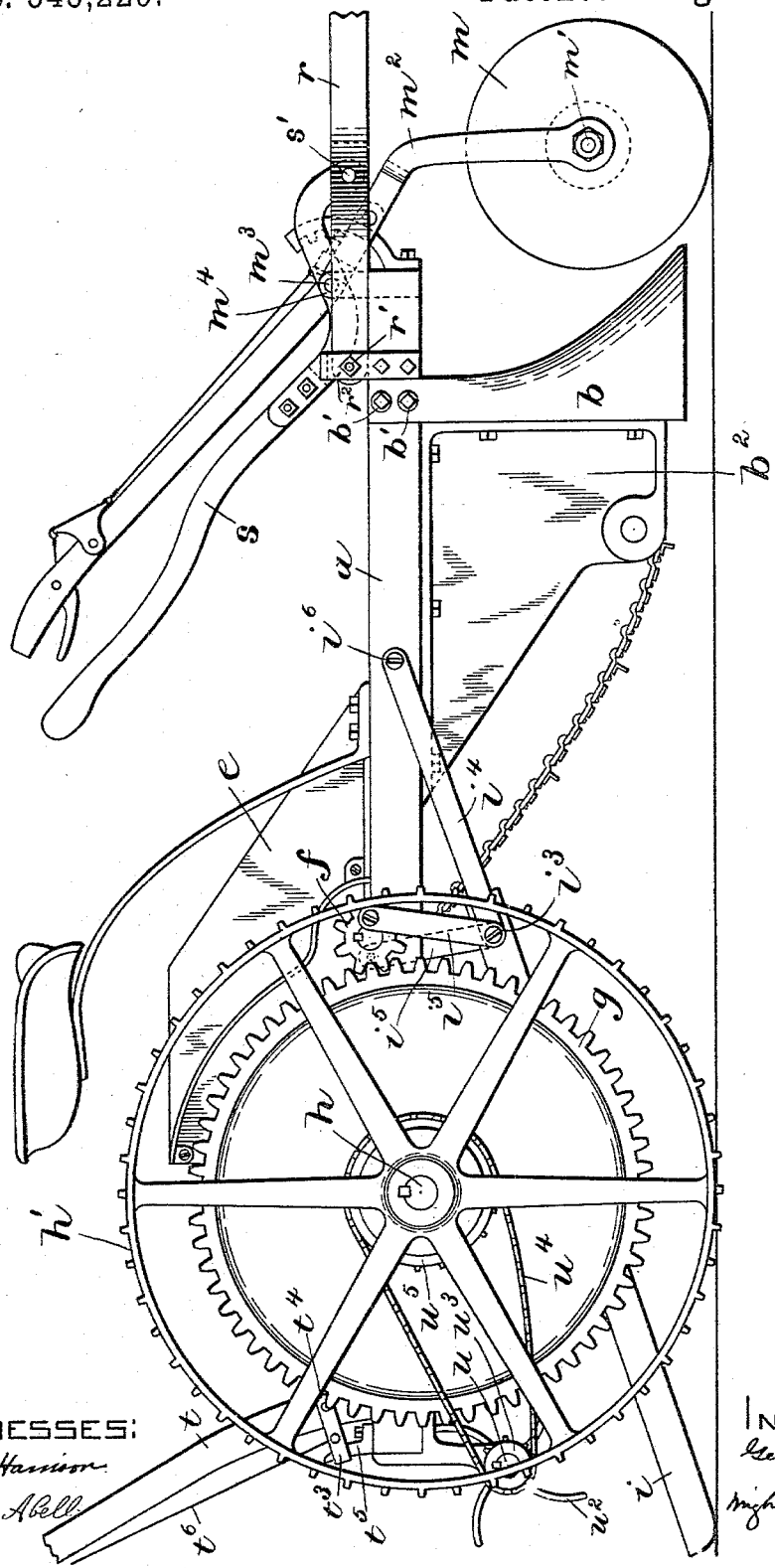
Figure 2:
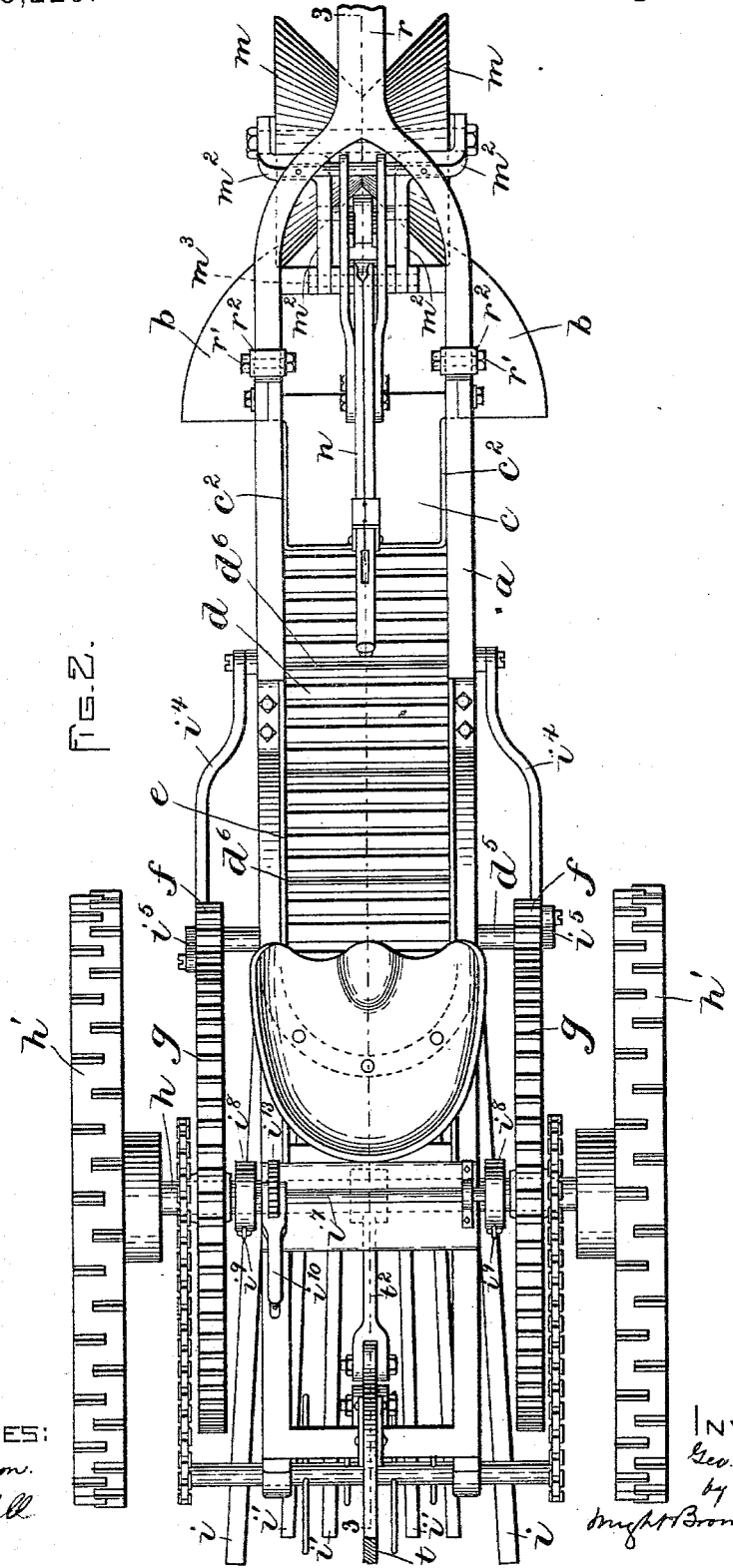
Figure 3:
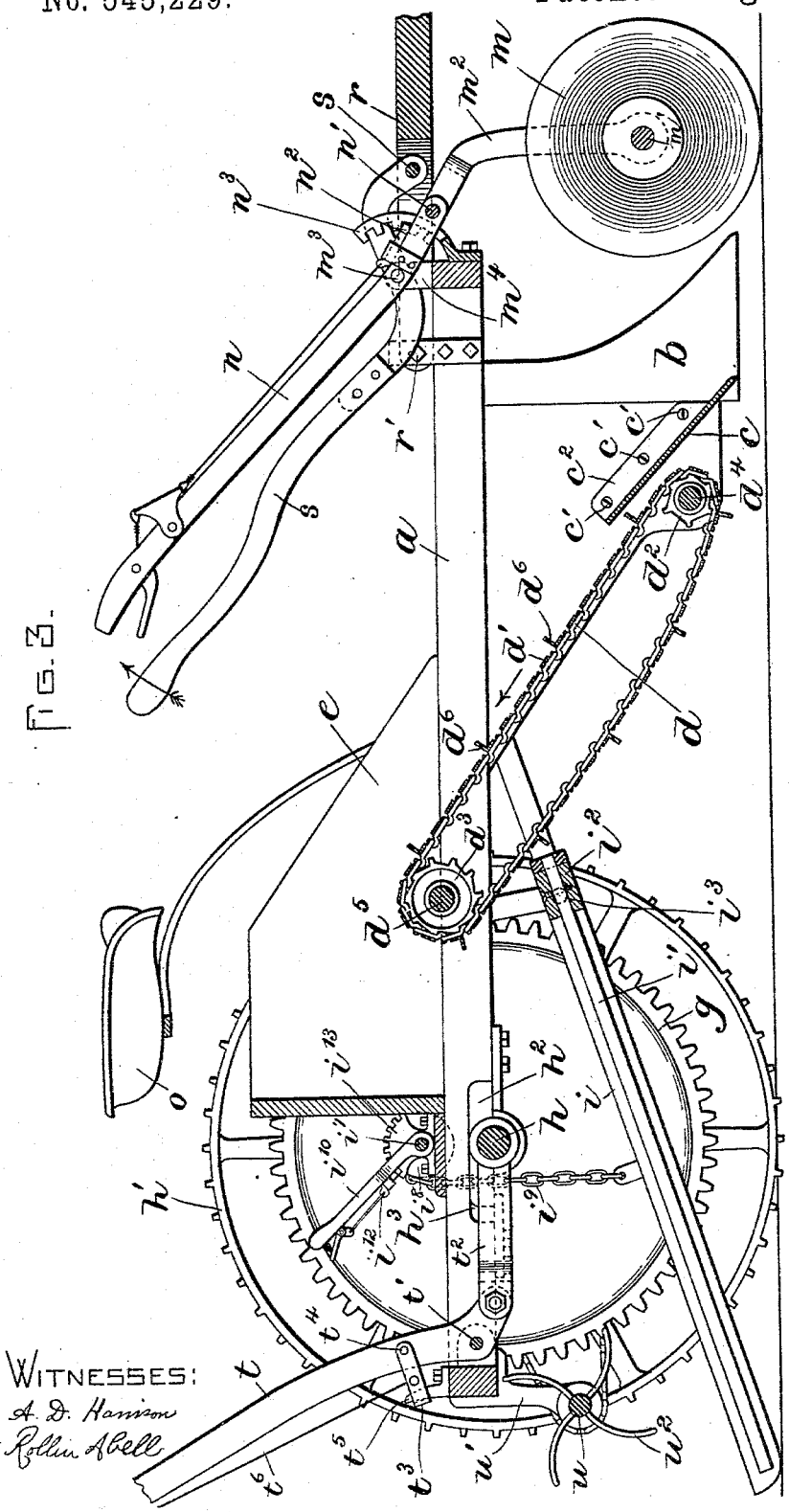

Of the accompanying drawings, forming a part of this specification, Figure 1 represents a side elevation of a machine embodying my improvements. Fig. 2 represents a top plan view of the same. Fig. 3 represents a section on line 3 3 of Fig. 2.

In the drawings, $a$ represents a stout rigid supporting-frame, composed of parallel side beams extending lengthwise of the machine, and suitable transverse connecting-beams.

$b\ b$ represent two half-plows or moldboards attached to the forward portion of the frame $a$ and projecting downwardly therefrom, said plows being separated from each other by a space of suitable width to include that portion of a row of potato-hills which includes the potatoes, the object of the plows being to cut off the surplus from both sides of the row, so that the machine will not be required to lift and dispose of more dirt than is necessary to properly harvest the potatoes. The plows may be attached to the frame in any suitable way. I have here shown their upper portions or shanks connected to the frame by bolts $b'$ and by brackets $b^2$, bolted to the edges of the plows and to the inside of the frame.

$c$ represents an inclined blade or scoop which extends across the space between and behind the plows and has its lower edge about on a level with the lower ends of the plows, said scoop being inclined upwardly, so that it deflects the potatoes and dirt left between the plows upwardly and backwardly. The scoop may be supported in any suitable way and is preferably attached by screws $c'$, passing through flanges $c^2$, formed upon the edges of the scoop, to the brackets $b^2$, the latter being formed to constitute side walls inclosing the space containing the scoop and the operative portion of the carrier hereinafter referred to, so that the potatoes and the earth raised by the scoop and by the carrier are prevented from falling out of the machine laterally by said brackets.

$d$ represents the carrier, which is composed of an endless series of transverse slats or pieces $d'$, the end portions of which are suitably affixed to sprocket-chains engaged with sprocket-wheels $d^2\ d^3$. Said wheels are arranged at different heights, the shaft $d^4$, supporting the wheels $d^2$, being journaled in bearings in the lower portions of the brackets $b^2$, while the shaft $d^5$, supporting the wheels $d^3$, is journaled in bearings in the frame $a$. This arrangement gives the carrier an inclined position, as shown in Fig. 3, the acting portion of the carrier extending from a point below and behind the upper end of the scoop $c$ to a point above the frame $a$, and being, moreover, arranged between the brackets $b^2$ which act, as already stated, to prevent the escape of the potatoes and earth from the carrier during their upward passage. The carrier is additionally protected by the inner sides of the side beams of the frame $a$ and by a shield $e$, attached to the upper side of the frame, the side portions of said shield forming walls which constitute a continuation of the inner sides of the brackets $b^2$ and of the inner sides of the beams of the frame in preventing any lateral escape of the potatoes and dirt.

To the shaft $d^5$ are affixed pinions $f\ f$, meshing with gear-wheels $g\ g$, affixed to the driving-shaft $h$ of the machine, said shaft being provided with the driving and supporting traction-wheels $h'\,h'$. The rotation of the wheels $h'$, caused by the progressive movement of the machine, is imparted to the shaft $d^5$ and sprocket-wheels $d^8$ by the gears $g$ and pinions $f\,f$, so that the carrier is progressively moved in the direction indicated by the arrow in Fig. 3 and is thus caused to raise the potatoes and dirt deposited upon it by the scoop $c$, the carrier being provided with transverse flanges $d^6$, arranged at suitable intervals, to prevent the potatoes and dirt from rolling downwardly along the inclined surface of the carrier. The carrier delivers the potatoes and dirt raised by it upon the upper portion of an inclined separator, which is composed of side bars $i\,i$ and a series of intermediate bars $i'$, all attached to a suitable cross bar or head $i^2$, which is provided with trunnions $i^3$, projecting laterally and journaled in bearings in the ends of links $i^4\,i^5$. The links $i^4$ are pivoted at $i^6$ to the frame $a$, and the links $i^5$ are eccentrically connected at their upper ends to the pinions $f\,f$, the arrangement being such that the rotation of said pinions causes a vertical reciprocating motion of the links $i^5$ and a corresponding oscillating motion of the links $i^4$, so that the trunnions $i^3$ are alternately raised and lowered, thus shaking or agitating the separator and causing the dirt deposited upon it to fall through the spaces between the bars or rods. The link $i^5$ at one side of the frame is connected with its pinion $f$ at a different point from the link $i^5$ at the opposite side, as shown by the full and dotted lines in Fig. 1, the arrangement being such that when one link is raised the other will be depressed, so that the separator receives a shaking motion in addition to its up and down motion.

When the machine is in operation, the rear ends of the bars or rods $i\,i'$ may trail upon the ground, or if preferred they may be held raised slightly above the ground. I prefer to provide means for raising the rear ends of the separator-bars in case they are allowed to trail upon the ground when in operation, so that when the machine is being turned or transported without being in operation the bars will not be subjected to wear or injury. For this purpose I show, in Figs. 2 and 3, a shaft $i^7$, extending across the frame and provided at its ends with disks $i^8$, to which are attached chains $i^9$, connected with the side bars $i\,i$ of the separator.

$i^{10}$ represents a lever attached to the shaft $i^7$ and provided with a locking-bolt $i^{12}$, which is adapted to engage the notches of a fixed locking-segment $i^{13}$ and thus hold the separator at any desired height. The bars $i\,i'$ are inclined, as shown in Fig. 3, so that the potatoes and dirt falling upon them from the carrier will roll downwardly by gravitation toward the rear end of the machine, the spaces between the bars being of such width that they will separate the potatoes and dirt, the latter sifting through the spaces, while the potatoes are carried to the rear ends of the bars and there deposited on the surface of the ground.

$m\,m$ represent two conical rollers mounted upon a rod or shaft $m'$, which is journaled in bearings in a yoke or frame composed of two side pieces $m^2$, which are pivoted at $m^3$ to ears $m^4$, affixed to the frame $a$, said yoke being adapted to swing or oscillate so as to raise and lower the rollers $m\,m$. The rollers $m\,m$ and their yoke $m^2$ may be adjusted at different positions relatively to the frame $a$ by means of a lever $n$, which is pivoted at $m^3$ and has its shorter arm connected by a rod or pivot $n'$ with the yoke $m^2$. The longer arm of said lever is within convenient reach of the driver when the latter is on the seat $o$, and is provided with a locking-bolt $n^2$, adapted to engage the teeth of a locking-segment $n^3$, affixed to the forward end of the frame $a$. Downward movement of the longer arm of the lever $n$ will swing the rollers $m$ forwardly and upwardly, thus increasing the depth of the entrance of the plows $b$ and scoop $c$ into the hills, while an upward movement of the longer arm of the lever $n$ depresses the rollers $m$ and thus decreases the depth of the plows and scoop. The plows and scoop may be raised in this manner sufficiently to permit the transportation of the machine from place to place without operation, the rollers $m$ supporting the forward end of the machine. Said rollers are formed and arranged to bear upon or bestride the row of hills at a point in advance of the plows $b$ and scoop $c$. The form of the rollers is such that they prevent lateral displacement of the machine by their engagement with the row. They also compress the earth at a point in advance of the plows and scoop and press down the weeds and vines, thus preparing the row for the action of the plows and scoop, so that the portion of the row that contains the potatoes is prepared to be taken up advantageously by the scoop.

$r$ represents the tongue, which is forked at its rear end and connected by pivots $r'$ with ears $r^2$ affixed to the forward portion of the frame, the tongue being adapted to swing vertically on said pivots.

$s$ represents a lever, which is fulcrumed at $m^3$ and has its shorter arm connected by a rod or pivot $s'$ with the tongue $r$, its longer arm projecting upwardly within convenient reach of the driver. It will be seen that as the fulcrum $m^3$ is attached to the frame and the rod or pivot $s'$ to the tongue, a movement of the lever $s$ in the direction indicated by the arrow marked thereon in Fig. 3 will raise the foward portion of the frame, together with the rollers, plows, and scoop, simultaneously from the ground, their weight being supported by the tongue and by the team attached thereto. This operation is performed when it is desired to permit the rollers and plow to pass over a rock or other obstruction in the field, or when it is desired to temporarily move the machine without digging, as when the machine is being turned at the ends of the rows. When the lever $s$ is released, its longer arm will move downwardly until the weight of the machine is supported by the plows and rollers.

To enable the driving-gears $g\ g$ to be quickly engaged with and disengaged from the pinions $f\ f$, I mount the shaft $h$, carrying said gears, in sliding boxes or bearings $h^2$, which are adapted to move in slots or ways $h^3$ in the frame $a$, so that the shaft with its gears may be moved laterally toward and from the pinions $f$, which are mounted in bearings in the frame $a$, the movement provided being sufficient to disengage the gears and pinions.

$t$ represents a lever pivoted at $t'$ to the frame $a$, and has its short arm connected by a link $t^2$ with the shaft $h$, the arrangement being such that when the longer arm of said lever is drawn forward the shaft $h$ and its bearings $h^2$ will be moved rearwardly on the frame, thus disengaging the gears $g$ from the pinions $f$. An opposite movement of the lever $t$ will draw the gears into engagement with the pinions. The lever $t$ may be locked to hold the gears in engagement with the pinions by means of a swinging locking-piece $t^3$, pivoted at $t^4$ to the lever $t$ and formed to engage a fixed ear or lug $t^5$ on the frame $a$. The said locking-piece may be connected by a rod $t^6$ with an operating-handle (not shown) at the upper end of the lever, whereby the locking-piece may be raised out of engagement with the lug $t^5$ when it is desired to move the lever $t$.

$u$ represents a shaft journaled in bearings in brackets $u'$ attached to the rear end of the frame $a$, said shaft being provided with radial arms $u^2$, the shaft and its arms constituting a clearing device adapted to remove from the separator any vines or other rubbish that may fail to pass through the spaces between the bars. The shaft $u$ is provided with sprocket-wheels $u^3$, which are connected by chains $u^4$ with sprocket-wheels $u^5$ affixed to the shaft $h$, so that when the machine is in operation the clearer is continuously rotated.

The operation of the machine as a whole is as follows: The rollers $m$ being adjusted to give the plows and scoop the desired depth, the machine is drawn along over a row, the controlling-rollers compressing the material and pressing down the vines. The plows cut away the side portions of the compressed row, while the central portion is taken up by the scoop and delivered to the carrier, the matter thus delivered being elevated by the carrier and dumped upon the separator, the motion of which separates the dirt from the potatoes, so that the latter are deposited upon the ground at the rear end of the separator. If a rock or other obstruction is encountered while digging the operator raises the rollers, plows, and scoops by an upward movement of the lever $s$. After passing the obstruction the said parts may be immediately depressed by releasing the lever. The lever is used in the same manner to raise the said parts in turning at the end of a row. When the machine is to be transported without digging, the rollers $m$ are depressed so as to raise the plows and scoop to their maximum height above the ground, the lever $m^2$ being locked to hold the rollers thus depressed.

The conical rollers $m$, formed and arranged to bestride the row in advance of the plows and scoop, constitute very important features of my invention, as they compress the row and press down the vines and keep the plows and scoop in the proper position relatively to the row and prevent them from sliding laterally off from the row, as they would be liable to do on side hills without said rollers.

I do not limit myself to the employment of two separate frusto-conical rollers $m\ m$, and may employ instead a single grooved roller having the same general form, although I prefer the two rollers capable of rotating independently.

For the sake of convenience, I hereinafter use the term "roller" and desire the same to designate either a single roller, which is smaller at its longitudinal center than at its ends, or two frusto-conical rollers or sections placed end-to-end.

I claim—

In a potato-digger, the combination of a suitably constructed frame, a tongue pivoted thereto, a lever pivotally connected with said tongue, a concaved roller mounted in a yoke, a lever pivotally connected with said yoke, a pivot on the frame and common to both levers above mentioned and to the yoke, means for locking the yoke-controlling lever at different positions, side plows on the frame back of the roller, a scoop between said plows, and an elevator adjacent to said scoop.

In testimony whereof I have signed my name to this specification, in the presence of two subscribing witnesses, this 24th day of May, A. D. 1894.

GEORGE N. HOLLAND.

Witnesses:
H. W. HAMMOND,
B. F. BROWN.